3,751,455
Patented Aug. 7, 1973

3,751,455
**METHOD OF PRODUCING 1,3-BIS(CARBOXY-
METHYL) ADAMANTANES**
Yoshiaki Inamoto and Hirokazu Nakayama, Wakayama,
and Hidetsugu Takenaka, Arita, Japan, assignors to
Kao Soap Co., Ltd., Tokyo, Japan
No Drawing. Filed Aug. 18, 1970, Ser. No. 64,815
Claims priority, application Japan, Aug. 20, 1969,
44/65,826; Aug. 21, 1969, 44/66,152
Int. Cl. C07c 51/00
U.S. Cl. 260—514 G   5 Claims

ABSTRACT OF THE DISCLOSURE 1,3-bis(carboxymethyl) derivatives of adamantane and alkyladamantanes are prepared in one step by the reaction of an adamantane, vinylidene chloride, and t-butyl alcohol in concentrated sulfuric acid in the presence of fuming sulfuric acid. The presence of fuming sulfuric acid is of absolute necessity because the second carboxymethyl group can not substantially be introduced into adamantane rings without fuming sulfuric acid.

BACKGROUND OF THE INVENTION

The only method known hitherto of preparing 1,3-bis (carboxymethyl)-adamantane and -alkyladmantanes is the reaction of 3-bromoadamant-(1)-ylacetic acid with vinylidene chloride in concentrated sulfuric acid containing borontrifluoride as catalyst (K. Bott, Chem. Ber., 101, 564 (1968); K. Bott and H. Hellmann, Angew, Chem., 78, 932 (1966)). However, the method has disadvantages of lengthy reaction path starting with admantane, low over-all yield, and use of expensive bromide in a large excess of stoichiometric amount, and therefore seems to be of little industrial importance.

DESCRIPTION OF THE INVENTION

The present invention relates to a new and novel method of producing 1,3-bis(carboxymethyl) derivatives of adamantane and alkyladamantanes. More particularly, the present invention relates to the preparation of 1,3-bis(carboxymethyl)-adamantane and -alkyladamantanes by the reaction of an adamantane compound with t-butyl alcohol and vinylidene chloride in concentraed sulfuric acid in the presence of fuming sulfuric acid. According to the method of the present invention, two carboxymethyl groups are introduced into an adamantane ring in one and the same reaction without isolating intermediates. Thus, the present invention provides a new and improved method of producing 1,3-bis(carboxymethyl) derivatives of adamantane compounds.

1,3-bis(carboxymethyl)-admantane and -alkyladamantanes produced by the present method are very useful substances as starting materials for the production of various intermediates and products, because of their unique properties owing to adamantane rings. For example, esters and amides have remarkable heat stability, and can be used as components in surface-active agents, lubricating oils, etc. Amines and isocyanates derived from these acids will give polyurethanes and epoxy resins having very good heat stability and fastness to light and weathering.

The art of the method of present invention lies in that a mixture of t-butyl alcohol and vinylidene chloride is dropped into a mixture of an adamantane compound and concentrated sulfuric acid which sometimes contains some hydrocarbon solvent, while fuming sulfuric acid is added during the reaction. The role of fuming sulfuric acid in the reaction is to maintain a certain level of the concentration of the sulfuric acid, which is ever decreasing owing to water produced by the reaction of t-butyl alcohol with sulfuric acid, as represented in the reaction scheme below, wherein Ad refers to an adamantane compound with or without alkyl substituent(s) and Ad+ refers to cation having adamantane ring structure with cationic center at a bridgehead position.

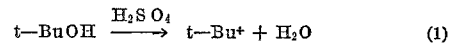   (1)
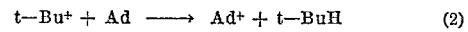   (2)
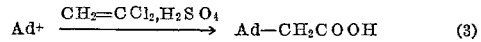   (3)
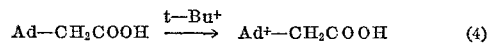   (4)
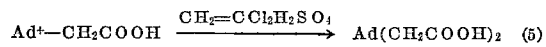   (5)

Maintaining the concentration of the sulfuric acid above a certain level is absolutely necessary in order to generate adamantyl cation intermediates in the hydride transfer (Reactions 2 and 4) which are very essential parts of the present method. In fact, we have found in our experiments that, if no fuming sulfuric acid is added, the second carboxymethyl group could not be introduced into an adamantane ring even if a larger excess of t-butyl alcohol and vinylidene chloride was added, the major reaction product from adamantane having been adamant-(1)-ylacetic acid.

The addition of fuming sulfuric acid is done in various ways: for example, all the amount is added at one time after one half of t-butyl alcohol-vinylidene chloride mixture has been added and reacted, or it may be added dropwise side by side with the t-butyl alcohol-vinylidene chloride mixture throughout the reaction period. The amount of the fuming sulfuric acid is that which is sufficient for putting the lowered concentration of sulfuric acid back to the original value it had at the beginning of the reaction, and this amount is determined by the concentration of sulfur trioxide in the fuming sulfuric acid employed and the amount of water produced from t-butyl alcohol according to Reaction (1).

Fuming sulfuric acid of any sulfur trioxide content can be used in the present method, but it would be of advantage to utilize one containing 20% to 25% by weight of sulfur trioxide because of the ease of handling and availability in industry.

The concentration of sulfuric acid to be used in the present method is 70% to 100% by weight, preferably 90% to 100%. Practically, no 1,3-bis(carboxymethyl) adamantane compound will be obtained with the use of sulfuric acid more diluted than 70%. The 90% to 100% sulfuric acid can be replaced with 80% to 90% sulfuric acid containing 5% to 10% boron trifluoride with almost the same results. Gaseous boron trifluoride, or its molecular complexes, for example, etherate or methanolate, may be used, and is mixed with sulfuric acid prior to the reaction.

It is preferable in the present method to use some hydrocarbon solvent to achieve better contact of the adamantane compounds with the other reagents. Aliphatic and alicyclic saturated hydrocarbons, for example, pentane, hexane, heptane, cyclopentane, and cyclohexane are suitable for this purpose. The amount of the solvent varies depending on the solubility of the admantane, and usually 5 parts to 15 parts for each part of the adamantane is enough.

The amount of t-butyl alcohol employed is generally 2 moles to 20 moles, preferably 6 moles to 10 moles, and that of vinylidene chloride is generally 6 moles to 30 moles, preferably 10 moles to 20 moles, for each mole of an adamantane compound.

Dropping of t-butyl alcohol-vinylidene chloride mixture must be done in the period not shorter than one hour, and the reaction mixture is then stirred at least for one hour after completion of the addition of the mixture. The reaction is run at 5° C. to 25° C., preferably at 8° C. to 12° C. Reaction temperatures higher than 25° C. give much inferior yields of the desired products, the major reaction product being $\beta,\beta$-dimethylbutyric acid.

The most convenient and efficient way of isolating the product is extraction of the organic layer of the reaction mixture with diluted solution of alkali, for example, sodium carbonate, potassium carbonate, sodium hydroxide, or potassium hydroxide, which allows separation of the desired product from any unreacted or neutral substances as well as from the reaction solvent if any. Acidification of the alkali solution gives the precipitate of 1,3-bis(carboxymethyl)-adamantane products which are purified by recrystallization from aqueous alcohols, the kind and concentration of which is determined by the solubility properties of the individual product.

The present method of bis-carboxymethylation is applicable, besides adamantane itself, to any alkyladamantanes in which at least two bridgehead positions are unsubstituted. The reactivity of these alkyladamantanes in the reactions of the present invention are substantially same as that of adamantane irrespective of the number and position of the alkyl substituents and, therefore, the reaction conditions described above can be employed to these compounds without substantial alteration.

The following examples are illustrative of the invention and, of course, are not intended to limit the scope of the claims. All temperatures are on the centigrade scale, and all melting points are uncorrected.

EXAMPLE 1

To the stirred mixture of 150 grams of 95% sulfuric acid, 6.8 grams of adamantane, and 40 ml. of cyclohexane kept at 8° to 10° C., a mixture of 22.2 grams of t-butyl alcohol and 58.2 grams of vinylidene chloride in a dropping funnel and 70 grams of 25% fuming sulfuric acid in another dropping funnel were dropped side by side during a period of 2 hours, and then the reaction is stirred at the same temperature for another 2 hours.

The reaction mixture was poured onto 500 grams of cracked ice. Organic layer was separated, aqueous layer being extracted with ether. Combined organic layer and ether extract was extracted three times with each 200 ml. of 5% sodium hydroxide solution, and the alkali solution was acidified (pH<1) with hydrochloric acid. White precipitates formed were filtered off, washed with water until the washings become weakly acidic (pH 3), and dried to give 9.9 grams (yield 78%) of crude 1,3-bis(carboxymethyl)adamantane, melting point 222–228° C. Recrystallization from 80% aqueous methanol gave 8.2 grams (yield 65%) of pure product, melting point 235–236° C. (melting point 234–236° C. is given by Bott, loc. cit.). This sample showed no depression of melting point on admixture with an authentic sample prepared by Bott's method. The elemental analysis was: Found (percent): C, 66.70; H, 8.03. Calcd. for $C_{14}H_{20}O_4$ (percent): C, 66.64; H, 7.99. Proton magnetic spectrum measured in a $d.^6$–DMSO solution showed signals at $\tau$ 8.02 (6 protons, singlet) and 8.47 (12 protons, ill-defined doublet) and infrared spectrum in KBr showed bands at 3000–2500, 1700, 1415, 1280 and 950 cm.$^{-1}$. These spectra were in complete agreement with those of the authentic specimen.

EXAMPLE 2

The procedure of Example 1 was repeated except that 180 grams of 90% sulfuric acid containing 20 grams of boron trifluoride etherate was employed in place of 150 grams of 95% sulfuric acid. The amount of pure 1,3-bis(carboxymethyl)adamantane obtained was 8.1 grams (yield 64%), and it had a melting point 235–235.5° C. The sample did not show any depression of mixture melting point, and gave the same NMR and IR spectra as those of the authentic specimen.

EXAMPLE 3

To the stirred mixture of 180 grams of 98% sulfuric acid, 6.8 grams of adamantane, and 40 ml. of cyclohexane kept at 8° to 10° C., a mixture of 15 grams of t-butyl alcohol and 29 grams of vinylidene chloride was dropped in 30 minutes, and then the reaction was stirred for further 1 hour.

Seventy grams of 25% fuming sulfuric acid was added to the above reaction mixture while the temperature was kept below 10° C., followed by adding another mixture of 15 grams of t-butyl alcohol and 29 grams of vinylidene chloride in 30 minutes. After being stirred for further 2 hours, the reaction mixture was poured onto 1 kilogram of cracked ice, organic layer being allowed to separate. Aqueous layer was extracted with ether, and combined ether extracts and organic layer was extracted five times with each 300 ml. of 5% sodium hydroxide solution. White precipitate obtained on acidification of the alkali solution was washed with water and dried. Recrystallization from 80% methanol gave 7.9 grams (yield 62%) of pure 1,3-bis(carboxymethyl)adamantane, melting point 234–235° C. The sample was identical in every respect with the authentic specimen.

EXAMPLE 4

The procedure of Example 1 was repeated except that 7.5 grams of 1-methyladamantane was used in place of 6.8 grams of adamantane. Eight and eight tenths grams (yield 67%) of pure 1,3-bis(carboxymethyl)-5-methyladamantane with the melting point 203–204° C. (the same melting point is given by Bott, loc. cit.) was obtained. This sample showed no depression of melting point on admixture with an authentic specimen prepared by Bott's method. The elemental analysis was: Found (percent): C, 67.31; H, 8.26. Calcd. for $C_{15}H_{22}O_4$ (percent): C, 67.64; H, 8.33. Infrared spectrum in KBr showed bands at 3000–2500, 1710, 1420, 1280 and 950 cm.$^{-1}$, and completely agreed with that of the authentic specimen.

While we have described our invention in detailed examples in connection with specific embodiments and applications, other modifications thereof will be readily apparent to those skilled in the art without departing from the spirit and scope of the invention as defined in the appended claims.

The embodiments of the invention in which an exclusive property or privilege is claimed are defined as follows:

1. A method for producing 1,3-bis(carboxymethyl) adamantane which comprises reacting one mole of adamantane with 2 to 20 moles of t-butanol and 6 to 30 moles of vinylidene chloride in sulfuric acid of concentration in the range of 70% to 100% at a temperature of 5° to 25° C. and adding during the course of the reaction sufficient fuming sulfuric acid to maintain the concentration of sulfuric acid in said range.

2. A method according to claim 1, in which the concentration of sulfuric acid is maintained in the range of 90% to 100% during the reaction.

3. A method according to claim 1, in which the concentration of sulfuric acid is maintained in the range of 80% to 90% during the reaction and the sulfuric acid contains from 5% to 10% of boron trifluoride.

4. A method according to claim 1, in which the adamantane is dissolved in a solvent selected from the group consisting of pentane, hexane, heptane, cyclopentane and cyclohexane.

5. A method according to claim 1, in which from 6 to 10 moles of t-butanol and from 10 to 20 moles of vinylidene chloride are reacted with one mole of adamantane at a temperature of 8° to 12° C.

References Cited
UNITED STATES PATENTS 3,250,805   5/1966   Lamola _____ 260—514

OTHER REFERENCES

Bott. Chem. Berichte 101, 564 (1968).
Fort, Jr. Chem. Reviews, 64, 287 (1964).

LORRAINE H. WEINBERGER, Primary Examiner
R. GERSTL, Assistant Examiner